EFFECT OF 11-37-0 ADDITIVE ON AVAILABILITY OF $P_2O_5$ IN NEUTRAL NITRIC PHOSPHATE SUSPENSIONS

EFFECT OF 11-37-0, ADDED AT VARIOUS pH LEVELS, ON SOLUBILITY OF $P_2O_5$ IN NITRIC PHOSPHATE SUSPENSIONS AMMONIATED TO pH 8.3 TO 8.5

AMMONIATION OF UNADJUSTED NITRIC ACID-ROCK EXTRACT (TEST 92)

AMMONIATION OF 1:1:1 RATIO NITRIC PHOSPHATE SUSPENSION WITHOUT POLYPHOSPHATE (TEST 99)

AMMONIATION OF 1:1:1 RATIO NITRIC PHOSPHATE SUSPENSION
WITH POLYPHOSPHATE (TEST 100)

$HNO_3$: CaO MOLE RATIO = 2.0
ADDITIVES: 11-37-0 (15% OF TOTAL $P_2O_5$)
KCl
CaO: $P_2O_5$ MOLE RATIO = 3.10

EFFECTS OF SULFATE ADDITIVE ON $P_2O_5$ SOLUBILITY
IN NITRIC PHOSPHATE SUSPENSIONS

AMMONIATION OF NITRIC ACID-PHOSPHATE ROCK EXTRACT
WITH SULFURIC ACID ADDITIVE (TEST 108)

RESPONSE OF CORN TO NITRIC PHOSPHATE SUSPENSIONS
(SPRAY TYPE APPLICATION)

United States Patent Office 3,477,843
Patented Nov. 11, 1969

3,477,843
METHOD OF PREPARING AMMONIATED NITRIC ACID-PHOSPHATE ROCK EXTRACTS
Archie V. Slack, Sheffield, Ala., assignor to Tennessee Valley Authority, a corporation of the United States
Filed Jan. 16, 1967, Ser. No. 609,558
Int. Cl. C01b 25/32
U.S. Cl. 71—39                                    8 Claims

ABSTRACT OF THE DISCLOSURE

A method is described whereby the ammoniation characteristics of nitric acid extracts of phosphate rock are improved, such ammoniation characteristics being of considerable importance in connection with the manufacture of certain fertilizer materials. The salient feature of the invention is the addition of a relatively small proportion of one or more soluble acyclic polyphosphate compounds to the extract after ammoniation has been carried to partial completion (pH 1.9–2.5). Such addition effectively inhibits the formation of apatite, or other compounds more basic than dicalcium phosphate, during the subsequent completion of ammoniation to neutrality. With use of such inhibitor, in accordance with the methods specified, the final neutralized extract contains its phosphate values almost exclusively as dicalcium phosphate, a compound that is much more readily assimilable by growing plants than are the more basic phosphates.

---

Figure 1:
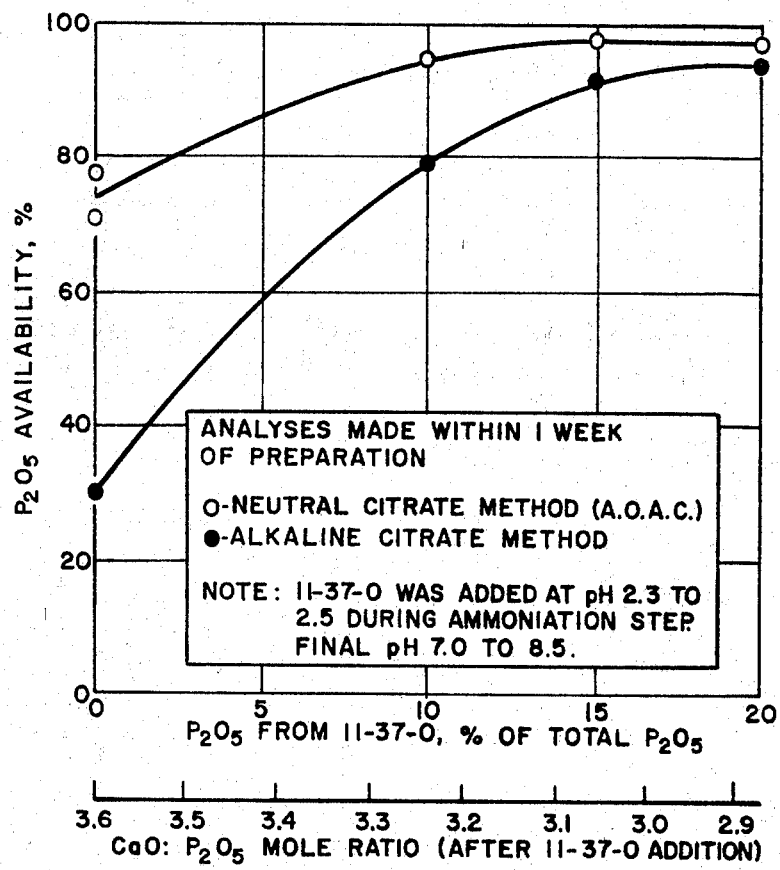

The invention herein described may be manufactured and used by or for the Government for governmental purposes without payment to me of any royalty thereon.

My invention relates to an improvement in certain characteristics of nitric acid-phosphate rock extracts, particularly the ammoniation characteristics thereof, and more particularly to an improved method of handling nitric acid-phosphate rock extracts such that during the subsequent ammoniation thereof I am able to inhibit the undesirable formation of apatite and other phosphate compounds that are unavailable as nutrient to growing plants. Still more particularly my invention relates to an improved method of ammoniating nitric acid-phosphate rock extracts through the use of a material which is believed to act as a reaction inhibitor such that the subsequent ammoniation to neutrality of extracts treated therewith results in precipitation of the $P_2O_5$ values therein almost exclusively as dicalcium phosphate—a compound that is recognized as a highly effective source of phosphorus for growing plants—which improved process substantially eliminates, during ammoniation of such extracts to neutrality, the precipitation of large proportions of the phosphorus values therein as apatite compounds in which the phosphorus is relatively unavailable as a nutrient for growing plants. I have found that the acid-rock extract ammoniated to neutrality after addition of the reaction inhibitor, according to my procedure, is useful as a suspension-type fertilizer; further, that the $P_2O_5$ values in the resulting suspension have been shown to be highly soluble in both neutral and alkaline citrate solutions which are accepted indications of high agronomic value; and further, that the $P_2O_5$ values, in greenhouse growth tests, are highly effective as fertilizer and are superior in this respect to the $P_2O_5$ values in neutral suspension made without use of the reaction inhibitor. Finally, I have found that the suspension has good keeping qualities when sufficient reaction inhibitor material is used.

Heretofore it has been the practice in the chemical fertilizer industry to obtain phosphorus—one of the three principal plant neutrients— by either producing elemental phosphorus by the thermal treatment of phosphate rock in combination with carbon and silicon whereby the smelting thereof produces elemental phosphorus vapors which are condensed and collected under water, a relatively expensive form of the plant nutrient, or by a relatively more economical method of winning by chemical means the phosphorus values from phosphorus ore. My invention relates particularly to this second and generally more economically attractive method of winning the phosphorus values from the phosphorus ore. Although this second method is generally accepted to be more economically attractive, it, unfortunately, is beset with certain chemical engineering problems which, in the past, have tended to somewhat offset the otherwise more economically attractive characteristics thereof. Of these several problems which have beset chemical engineers in the past, perhaps the one of greatest significance relates to the nature of the phosphorus ore from which it is desired to win the $P_2O_5$ values therefrom.

The phosphorus in most commercial phosphate ores is present largely as the mineral fluorapatite [$Ca_{10}F_2(PO_4)_6$; $CaO:P_2O_5$ mole ratio=3], a form from which it is not readily assimilated by growing plants. In preparation of phosphate fertilizers, it is common practice to subject the ore to some treatment or series of treatments that first decomposes the apatite compound and then converts the phosphorus to compounds from which it can be readily assimilated by growing plant systems. A common method of decomposing the apatite is treatment with mineral acids. Any of several acids can be used; however, it is often economically advantageous to employ nitric acid. Processes in which nitric acid is employed are commonly referred to as nitric phosphate processes and the resultant products usually are referred to as nitric phosphates (solid products) or nitric phosphate suspensions (suspension-type fertilizers).

The reaction of phosphate rock with nitric acid results in dissolution of essentially all the calcium and phosphorus as well as most impurities in the ore. The solute of the resultant solution consists chiefly of calcium nitrate and phosphoric acid plus small amounts of fluorine and various other impurities from the rock. Such an extract solution is highly acidic and highly corrosive and therefore is generally undesirable either for direct use as a fluid-type fertilizer or as an intermediate material to be dried to form a solid-type fertilizer. It is, therefore, common practice to introduce ammonia into the acid-rock extract solution to neutralize the acidity of the extract. Such introduction of ammonia also is of considerable economic advantage, since ammonia is the lowest cost form of nitrogen fertilizer.

As ammonia is introduced into nitric acid-phosphate rock extract, various chemical reactions occur which result in the precipitation of solid calcium phosphate compounds. It is well known, from previous experiments, that during the course of progressive ammoniation of such extract, the major solid phosphate that precipitates initially is dicalcium phosphate $$(CaHPO_4; CaO:P_2O_5 \text{ ratio}=2)$$

a highly effective solid fertilizer compound. As ammoniation progresses, continued precipitation of essentially pure dicalcium phosphate occurs until such time as approximately 90 percent of the phosphorus has been precipitated. At this point, however, the resultant slurry is still too acidic (pH about 2.3), and too corrosive, to be desirable as a suspension-type fertilizer. Also, for processing into solid fertilizers by drying, the slurry is not satisfactory at this point because it contains, in solution, considerable amounts of calcium nitrate, the presence of which in a solid nitric phosphate would drastically increase the hygroscopicity of the product. Continued ammoniation of the extract to neutrality or near neutrality overcomes the corrosive nature of the slurry but, unfortunately, has a very undesirable effect on the nature of the precipitated phosphate compound. Not only does the remaining 10 percent of the $P_2O_5$ precipitate from the extract largely as unavailable apatite, but also a large proportion of the previously precipitated dicalcium phosphate reacts with soluble calcium in the extract and is thus converted to undesirable apatite. The resultant neutral slurry therefore does not have satisfactory fertilizer value for direct use as a suspension fertilizer or for processing into solid form.

In solid nitric phosphate processes, it is common practice to minimize the formation of apatite and simultaneously eliminate calcium nitrate by "adjusting" the $CaO:P_2O_5$ mole ratio in the acid-rock extract to about 2 (the stoichiometric ratio for formation of dicalcium phosphate) prior to ammoniation. Such adjustment is often effected by introducing phosphoric acid. Usually, the phosphoric acid is mixed wtih the nitric acid prior to extraction of the rock; in this manner, the acidulating value of the phosphoric acid is utilized and the nitric acid requirement is reduced. For adjustment of $CaO:P_2O_5$ ratio to 2, the amount of $P_2O_5$ required as acid is about 80 percent as much as that obtained from the rock, thus considerable expense is entailed in making adjustment by this method. Another common method of adjustment is the introduction of a soluble sulfate such as sulfuric acid or potassium sulfate. Such procedure results in removal (precipitation) of calcium from solution as the sulfate and consequent altering of the $CaO:P_2O_5$ ratio to 2. A serious disadvantage of this method of adjustment, however, is a lowering of the grade of the final product because of the dilution effect of the calcium sulfate.

In the preparation of nitric phosphate suspension-type fertilizers, adjustment of the $CaO:P_2O_5$ mole ratio to 2.0 by the above methods may be used as a means of permitting ammoniation to neutrality without formation of apatite or other relatively "unavailable" phosphate compounds. However, the other effect of adjustment, the elimination of calcium nitrate, is of no importance in the case of suspension-type fertilizers. Furthermore, both of the methods for adjustment described above have very serious disadvantages when applied to suspension fertilizers. With the first method, the amount of phosphoric acid required is so great that the economic advantage of the suspension process is largely dissipated. In the case of adjustment with sulfuric acid, the lowering of the grade of the product is considerable with resultant increases in handling and distribution costs. Also, we find that in the case of neutral suspension fertilizers, the use of sulfate additive does not prevent conversion of an excessive proportion of the $P_2O_5$ value to apatite, which apatite is of little or no agronomic value.

In view of the disadvantages of adjusting $CaO:P_2O_5$ mole ratio to 2 in preparation of suspension-type nitric phosphate fertilizers, it would be of considerable value to have available a method by which unadjusted extract could be ammoniated to neutrality without significant formation of apatite or other unavailable phosphate. My present invention, described infra, constitutes a practical and economical method by which this may be accomplished.

Various materials have been suggested in the prior art for addition to nitric acid-rock extracts in relatively small proportions to permit ammoniation of the extract to neutrality without degradation of the phosphate to unavailable forms. Among the materials suggested have been sulfuric acid (in proportion less than that required to adjust $CaO:P_2O_5$ mole ratio to 2), potassium sulfate, and compounds of magnesium, aluminum, and other metals. I have tested the suggested additives and have found them to be ineffective when used in economical proportions. While one of these materials, namely, sulfuric acid, did increase the neutral citrate solubility of the precipitated phosphate in my tests, the alkaline citrate solubility which often is more closely related to agronomic response was not increased by use of sulfuric acid. X-ray analyses of the products made with sulfuric acid additive showed that the formation of apatite had not been prevented by the use of sulfuric acid. The apatite that formed in the presence of sulfate was however of reduced particle size, which explains the relatively high solubility of the $P_2O_5$ in neutral citrate reagent. Such indicated high solubility, therefore, constitutes a false indication of agronomic value of the $P_2O_5$ content of such a suspension.

I have found that the addition of a relatively small amount of materials selected from a group which is believed to act as a reaction inhibitor such, for example, as soluble acyclic polyphosphate compounds, to partially ammoniated nitric acid-phosphate rock extract is highly effective in preventing formation of apatite and other unavailable compounds during the subsequent ammoniation to neutrality.

I have found that the resultant neutralized extract contains precipitated phosphate almost exclusively in the form of dicalcium phosphate; hence, both neutral and alkaline citrate solubilities thereof are high. Although the solution phase of the so neutralized extract contains considerable amounts of soluble calcium, I have found that the added reaction inhibiting material effectively acts in a manner to form a protective coating on or otherwise inactivate the surface of the dicalcium phosphate particles to inhibit their reaction with the soluble calcium to form apatite. I am therefore able to handle nitric acid extracts of phosphate rock such as, for example, the ammoniation thereof, in a manner so as to inhibit the undesirable formation of apatite and other phosphate compounds that are unavailable as nutrients to growing plants and, in fact, I have found that through the use of my reaction inhibiting materials the ammoniation of such extracts to neutrality results in precipitation of the $P_2O_5$ almost exclusively as dicalcium phosphate, a compound which is generally recognized as a highly effective source of phosphorus for the growing plant.

It is therefore an object of the present invention to provide an improved method of handling nitric acid-phosphate rock extracts to improve the ammoniation characteristics thereof in a manner so as to prevent the formation of apatite and other unavailable compounds when such nitric acid-phosphate rock extracts are subsequently ammoniated to neutrality.

Still another object of the present invention is to provide an improved method of handling nitric acid-phosphate rock extracts to improve the ammoniation characteristics thereof in a manner so as to prevent the formation of apatite and other unavailable compounds when such nitric acid-phosphate rock extracts are subsequently ammoniated to neutrality; said improved method characterized by the fact that when said nitric acid-phosphate rock extracts are subsequently ammoniated to neutrality the precipitation resulting therefrom is substantially dicalcium phosphate, a compound that is recognized as a highly effective source of phosphorus for growing plants.

A further object of the present invention is to provide an improved method of handling nitric acid-phosphate rock extracts to improve the ammoniation characteristics thereof in a manner so as to prevent the formation of apatite and other unavailable compounds when such nitric acid-phosphate rock extracts are subsequently ammoniated to pH above about 2.3; said improved method characterized by the fact that the acid-rock extract sensitivity to local overammoniation is substantially reduced, thereby greatly enhancing the economics of the process by limiting the subsequent loss of $P_2O_5$ "availability" during said ammoniation and by eliminating the need for expensive equipment or procedures, such as multistage ammoniators, that are normally employed to prevent localized overammoniation.

Still further and more general objects and advantages of the present invention will appear from the more detailed description set forth below, it being understood, however, that this more detailed description is given by way of illustration and experimentation only and not by way of limitation, since various changes therein may be made by those skilled in the art without departing from the true spirit and scope underlying the concept of the present invention.

In carrying out the objects of my invention in one form thereof, I have employed as my reaction inhibiting material certain polyphosphate materials, namely, solution-soluble acyclic polyphosphates. By solution-soluble acyclic polyphosphates I mean those sources of acyclic polyphosphate materials which are soluble in the solution with which my invention is concerned, i.e., the nitric acid-phosphate rock extract suspension. In the broadest embodiments of my invention, my discoveries dictate that the source material to be used as my reaction inhibitor need only be such a material which, when in solution, is able to furnish the necessary acyclic polyphosphate anions. In certain preferred embodiments I have used as a source for such acyclic polyphosphate ammoniated superphosphoric acids. Although superphosphoric acid hydrolyzes very quickly to orthophosphoric acid at slightly elevated temperature when mixed with water, it is possible to ammoniate the superphosphoric acid substantially to the neutral point without any appreciable hydrolysis. The resulting solution of ammonium salts of acyclic polyphosphoric acids is stable, as is shown in U.S. Letters Patent No. 2,950,961, Striplin et al., assigned to the assignee of the present invention. In other embodiments of my invention I have used other sources for the solution-soluble acyclic polyphosphates and mixtures thereof. Among these are (1) alkaline earth polyphosphates, for example, calcium and magnesium polyphosphates; (2) alkali polyphosphates including, for example, ammonium, sodium, and potassium polyphosphates; and (3) superphosphoric acid and derivatives thereof, one of which derivatives has been shown in my preferred embodiment supra to be ammoniated superphosphoric acids which also is included in the alkali polyphosphate (2) above.

In one test typical of those using metallic salts as the reaction inhibitor, essentially pure sodium tripolyphosphate was used as the reaction inhibitor material. In this test, phosphate rock was extracted with nitric acid in the usual manner and the extract was ammoniated to pH 2.3 prior to addition of the sodium tripolyphosphate. The sodium tripolyphosphate, in pulverant form, was then added in proportion sufficient to provide 15 percent of the total $P_2O_5$ in the final products and ammoniation to neutrality was completed. Results were in every way equal to those obtained with the ammoniated superphosphoric acid (11-37-0) which I prefer to use as a source of polyphosphate because of its ready availability on the fertilizer market and its relatively low cost. With the sodium tripolyphosphate inhibitor, both neutral and alkaline citrate solubilities of $P_2O_5$ in the neutral product exceeded 90 percent, which result provides a demonstration of the effectiveness of soluble metallic polyphosphates, which I include among those materials that I find to be effective reaction inhibitors.

In another series of tests, the polyphosphate additive (11-37-0 ammoniated superphosphoric acid) was highly effective even when added in such a small proportion that only 10 percent of the total phosphate in the final suspension was derived from the additive; the proportion of $P_2O_5$ added as polyphosphate in this case represented only about 7 percent of the total phosphate. Addition of this proportion of polyphosphate (test 51) effected an increase in neutral citrate solubility of the $P_2O_5$ from about 75 to 95 percent and an increase in alkaline citrate solubility from only 30 percent to 79 percent. Even greater increases in neutral citrate solubility and alkaline citrate solubility were effected by using slightly higher proportion of polyphosphate. For example, when 15 percent of the total $P_2O_5$ was derived from 11-37-0 (about 10 percent of the total $P_2O_5$ as polyphosphate [test 45]), neutral citrate solubility of the $P_2O_5$ was 98 percent and alkaline citrate solubility was 91 percent. Use of higher proportions of 11-37-0, such as 20 percent of the total $P_2O_5$ (test 46) and 30 percent of the total $P_2O_5$ (test 47) similarly resulted in high neutral and alkaline citrate solubilities.

Petrographic examination of the solid phases of the neutralized suspensions showed that when polyphosphate additive was used the major phosphate present was anhydrous dicalcium phosphate, whereas without polyphosphate the major solid was apatite. Chemical analyses showed that when polyphosphate additive was used about 20 percent of the calcium remained in the solution phase, thus offering evidence of the effectiveness of the polyphosphate in inhibiting reaction between soluble calcium and the solid dicalcium phosphate in the suspension. Without additive, only 5 percent of the calcium was found in the solution phase.

Both the products made with 10 percent of the $P_2O_5$ from 11-37-0 (test 51) and those made with 15 percent from 11-37-0 (test 45) evidenced some slight reversion to apatite during storage after about 45 days. Thus, these amounts of polyphosphates (7 and 10 percent respectively) for a suspension that is to be utilized immediately are quite sufficient; however, these amounts probably would not be completely sufficient for a suspension which was intended to be held in long-term storage (more than about 2 months). However, product made with 20 percent of the $P_2O_5$ from 11-37-0 (14 percent of the $P_2O_5$ from polyphosphate) was unchanged (highly soluble) after 45 days of storage at room temperature and that made with 30 percent of the $P_2O_5$ from 11-37-0 was essentially unchanged after 75 days of storage.

I have also discovered in this series of tests that there is an optimum pH range in which to add the 11-37-0 during the ammoniation step. For example, ammoniation of the acid-rock extract was carried to different degrees of completion, as indicated by pH measurements, prior to addition of the 11-37-0. Immediately after addition of the 11-37-0, ammoniation was resumed and carried to, or slightly above, neutral pH. The results showed that addition of 11-37-0 was most effective in inhibiting apatite formation and increasing neutral and alkaline citrate solubilities when it was added to extract that had been ammoniated at least to pH 1.9 and to no higher than pH 2.5. When addition was made below this pH range, the 11-37-0 was ineffective, probably because its polyphosphate constituent was rapidly hydrolyzed at the low pH. When addition was made above the optimum range, effectiveness of the 11-37-0 was reduced because significant amounts of apatite had formed prior to the addition.

Aside from the advantages already pointed out for use of 11-37-0 or other polyphosphate additive in the ammoniation of nitric acid-rock extract, there is at least one other advantage; namely, the reduction in sensitivity of the extract to localized overammoniation. In existing nitric phosphate processes, considerable precautions and accompanying extra expense are involved in preventing localized overammoniation and subsequent loss of $P_2O_5$ "availability" in the ammoniation systems. Typical precautions are the provision of multistage ammoniators and the limitation of ammoniation rates to low values. However, with addition of polyphosphates to inhibit formation of unavailable $P_2O_5$ during ammoniation, according to my invention, it should be possible to largely dispense with these precautions and thereby effect savings in equipment and operating costs.

My invention together with further objects and advantages thereof will be better understood from a consideration of the following descriptions, examples, and tabulations, taken in connection with the accompanying drawings in which:

FIGURE 1 is a diagrammatical illustration of the effect of one of my reaction-inhibiting materials on availability of $P_2O_5$ in neutral nitric phosphate slurries. It confirms that there is in fact a favorable effect of addition of one of my reaction-inhibiting materials on neutral ammonium citrate solubility, and further, that there is a favorable effect on alkaline citrate solubility of the $P_2O_5$.

Figure 2:
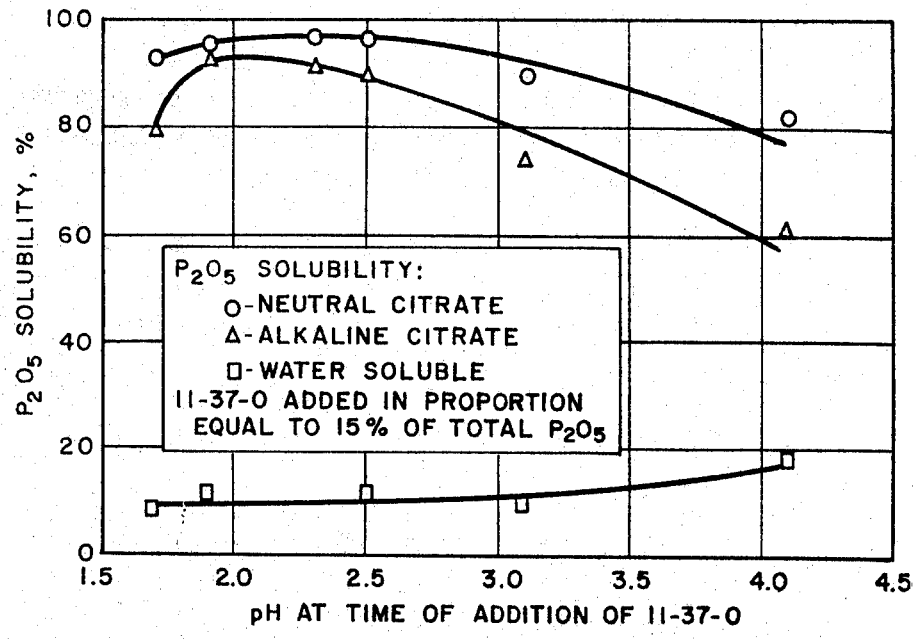

FIGURE 2 is a diagrammatical illustration of the effect that one of my reaction-inhibiting materials has on the solubility of $P_2O_5$ in nitric phosphate slurries at various pH levels.

Figure 3:
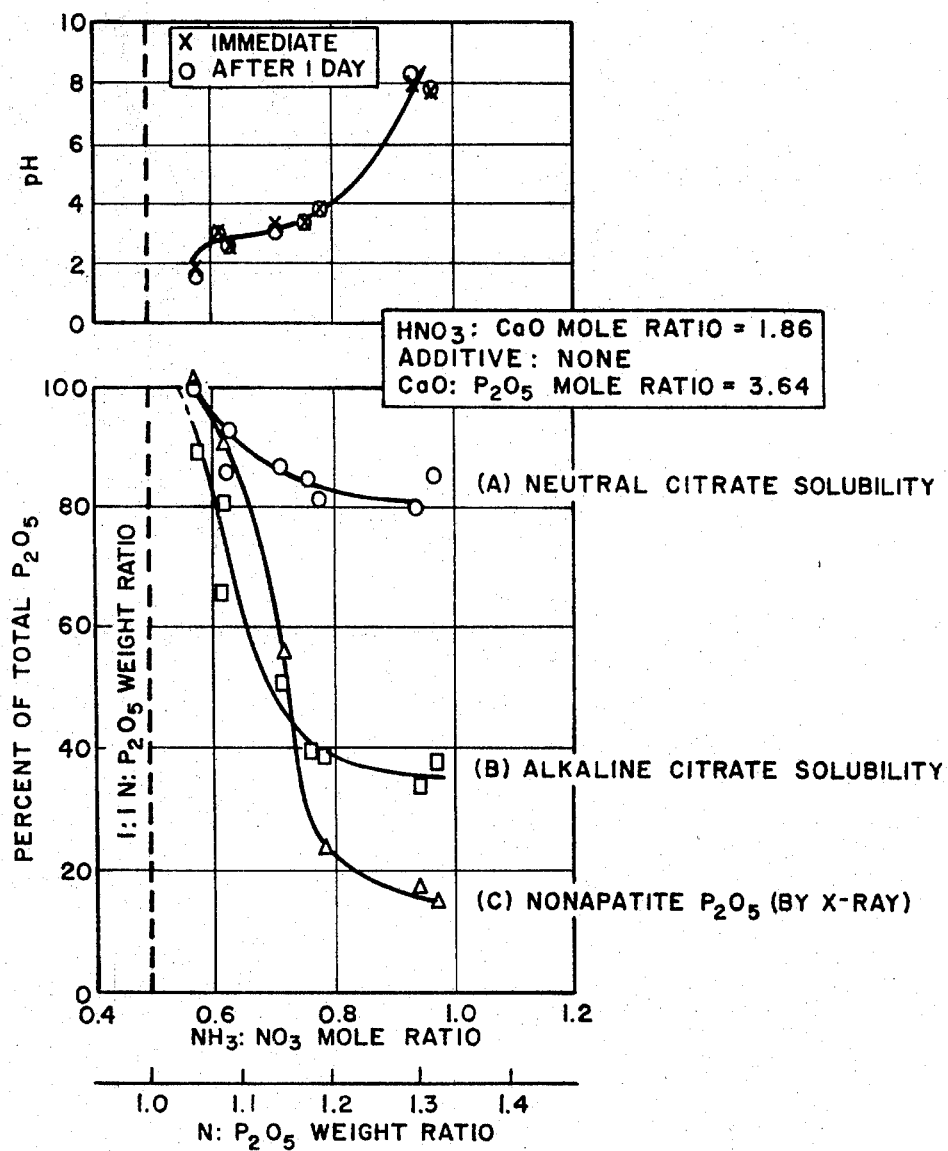

FIGURE 3 is a diagrammatical illustration of the marked decrease in both neutral citrate and alkaline citrate solubility when unadjusted nitric acid-phosphate rock extracts are subjected to ammoniation without the benefit of an additive from the group of materials comprising my reaction-inhibiting materials. Also shown is the marked decrease in the dicalcium phosphate constituent in such unadjusted extracts when subjected to ammoniation.

Figure 4:
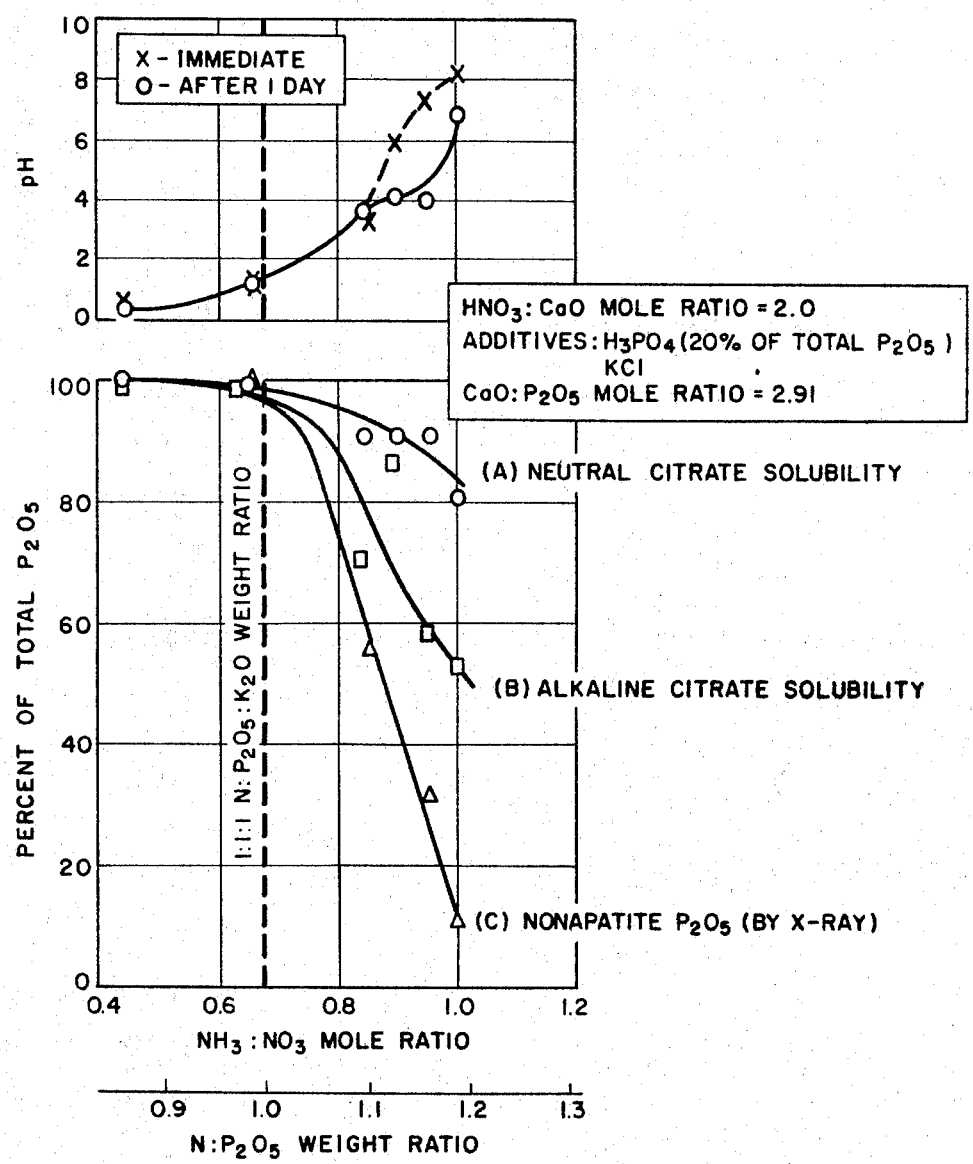

FIGURE 4 is a diagrammatical illustration of the marked decrease in both neutral citrate and alkaline citrate solubility when nitric acid-phosphate rock extracts, blended with sources of potassium and phosphoric acid to yield a slurry of 1:1:1 ratio, are subjected to ammoniation without the benefit of an additive from the group of materials comprising my reaction-inhibiting materials. Also shown is the marked decrease in the dicalcium phosphate constituent in such unadjusted extracts when subjected to subsequent ammoniation.

Figure 5:
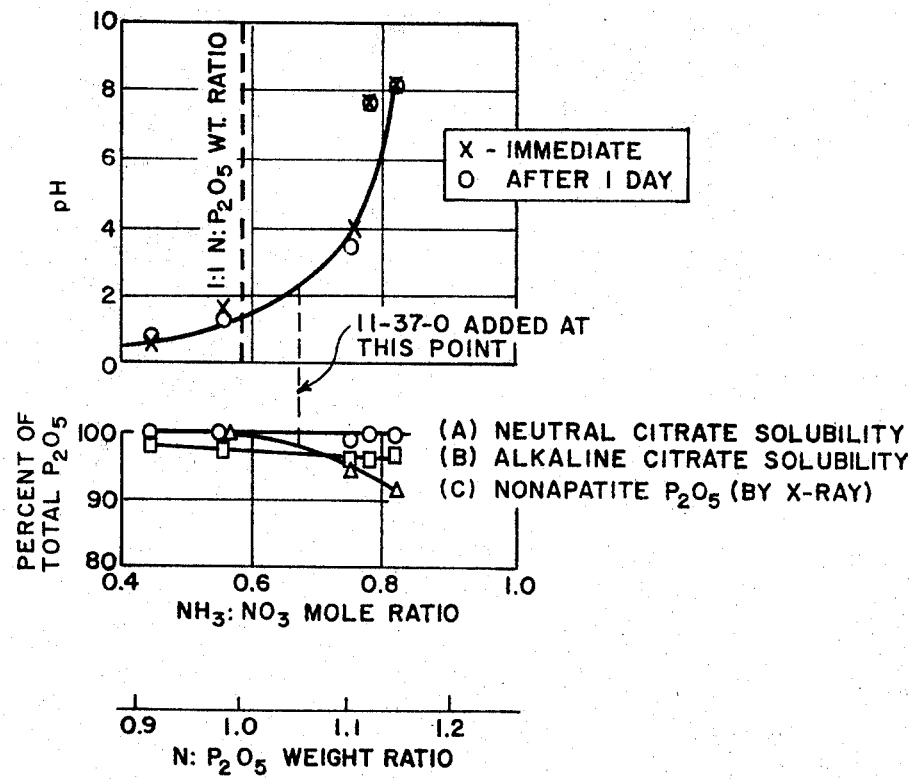

FIGURE 5 is a diagrammatical illustration intended for direct comparison with FIGURE 4 supra. In the case of FIGURE 5, the nitric phosphate slurry of a 1:1:1 ratio was prepared by my recommended procedure which involves introduction of an additive selected from the group comprising my reaction inhibitor materials prior to ammoniation thereof.

Figure 6:
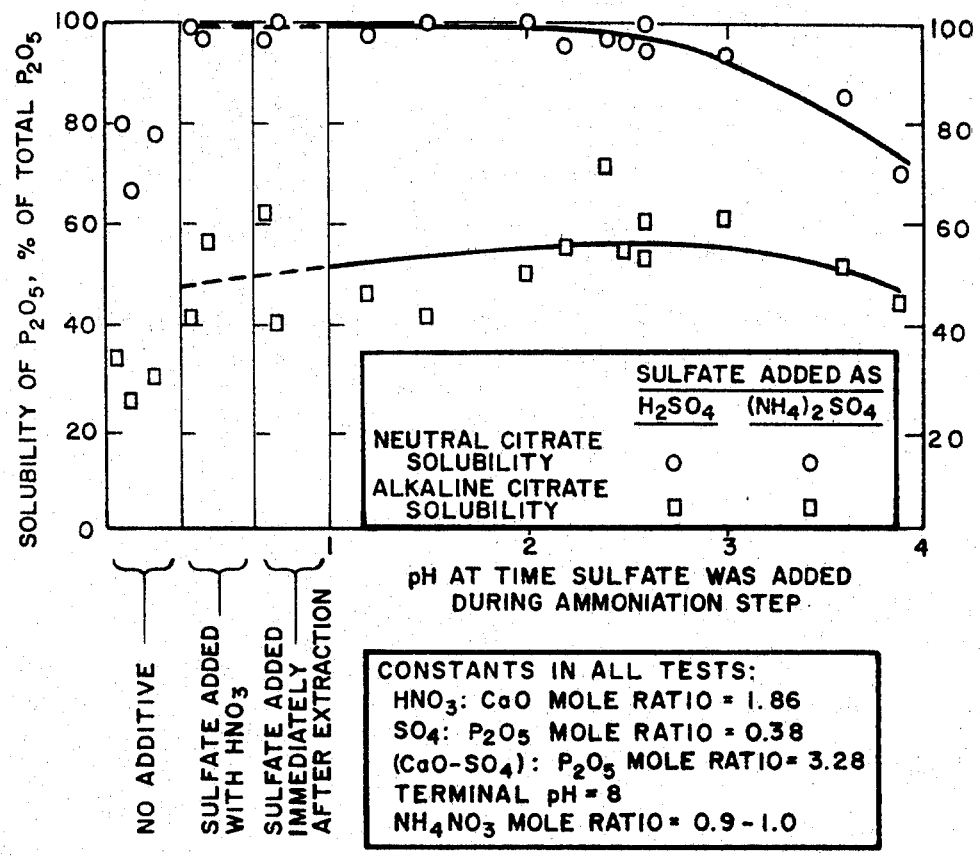

FIGURE 6 is a diagrammatical illustration of the lack of desired effect that various sulfate additives have on maintaining high degrees of $P_2O_5$ solubility during ammoniation of nitric phosphate suspensions, and more particularly, that such sulfate additives are ineffective in maintaining high neutral citrate solubility when the addition is withheld until after ammoniation is carried to above a pH of about 2.5, and still more particularly that as to alkaline citrate solubility, said sulfate additives resulted in only a very small increase over that obtained without the benefit of any additive regardless of the pH at which said additive was incorporated during the ammoniation thereof.

Figure 7:
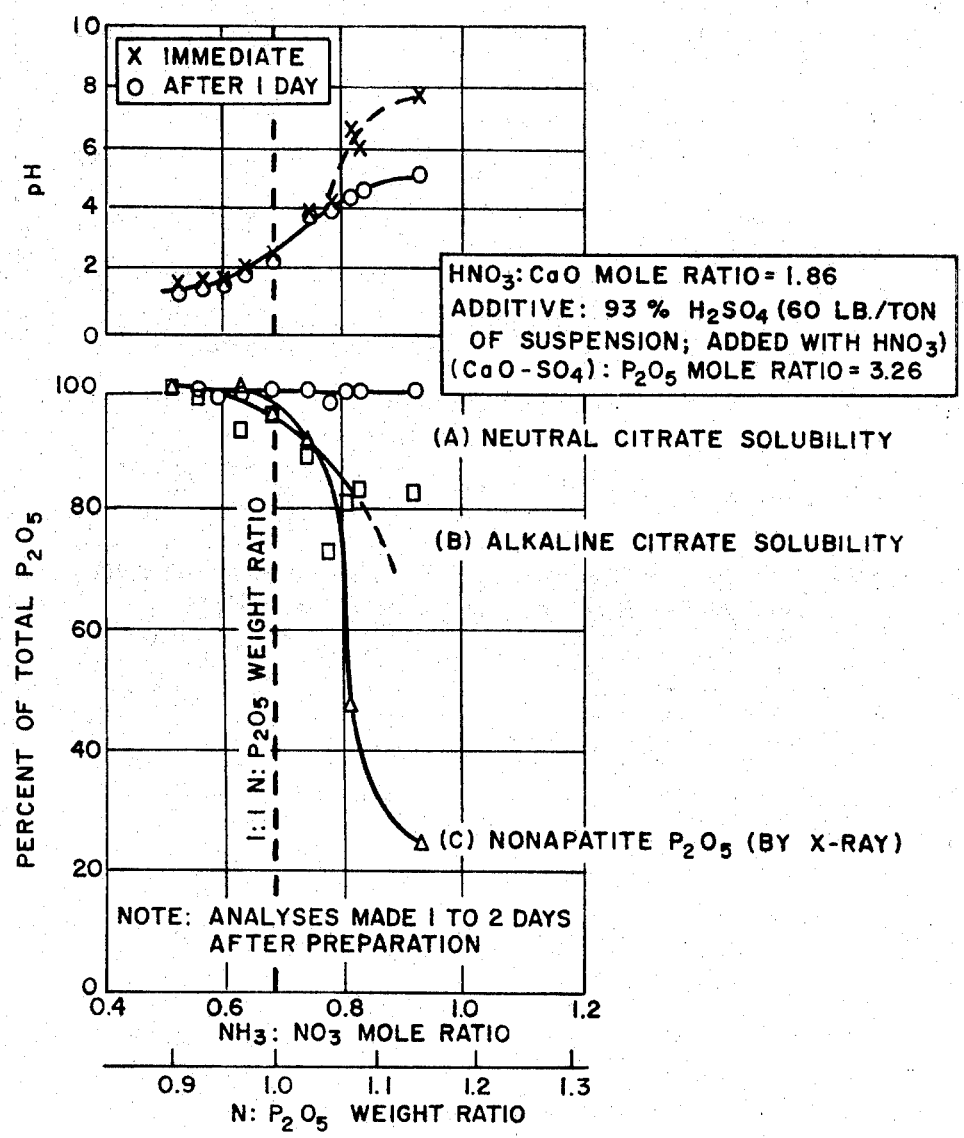

FIGURE 7 is a diagrammatical illustration of further refinements of test data plotted in FIGURE 6 supra and clearly shows that the presence of the sulfate additive did not prevent formation of apatite.

Figure 8:
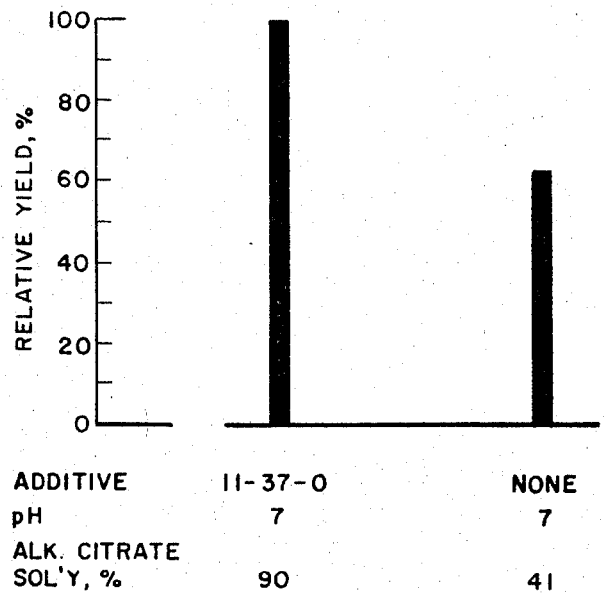

FIGURE 8 is a diagrammatical illustration of the results of growth tests of corn plants carried out in a greenhouse. In this figure, a relative yield of 100 percent represents the dry weight of corn plants after 6 weeks growth in a pot of soil fertilized with nitric phosphate suspension prepared with introduction of an additive selected from the group comprising my reaction inhibitor materials prior to ammoniation thereof. It is readily seen from this figure that the growth was about 40 percent less in a pot treated in exactly the same manner except fertilized with a nitric phosphate suspension prepared without the benefit of an additive from the group comprising my reaction inhibitor materials.

In order that those skilled in the art may better understand how the present invention can be practiced and more fully and definitely understood, the following examples of my processes which I have used in improving the method of handling nitric acid-phosphate rock extracts to improve the ammoniation characteristics thereof, as has been indicated herein, are given by way of illustration and not by way of limitation.

EXAMPLE I—FIGURE 1

Reference is now made more specifically to FIGURE 1. A series of exploratory tests had indicated that addition of ammonium polyphosphate (11–37–0 liquid fertilizer) to nitric phosphate suspension during ammoniation might permit ammoniation to neutrality without serious loss of neutral citrate availability. When 11–37–0 equivalent to 10 percent of the total $P_2O_5$ was added during ammoniation (added at pH 2.4) and ammoniation was continued to pH of about 8, the neutral citrate solubility of the $P_2O_5$ was 97 percent; the alkaline citrate solubility of the $P_2O_5$ was not determined. The further tests, results of which are represented by FIGURE 1, confirm the favorable effect of addition of 11–37–0 on neutral ammonium citrate solubility and, further, show a favorable effect on alkaline citrate solubility of the $P_2O_5$. Results of these tests are given in Table I below and also in FIGURE 1. As will be discussed, $P_2O_5$ solubilities decreased during long-term storage (30–40 days) except when at least 20 percent of the total $P_2O_5$ was from 11–37–0.

The materials used in the tests were Florida flotation concentrate (−10 mesh), 42 percent nitric acid, anhydrous gaseous ammonia, and 11–37–0 grade ammoniated superphosphoric acid. Extraction and ammoniation were carried out in the same vessel (cylindrical jar, 8¾ inches in diameter and 9¾ inches high). Two 2-inch air-driven propellers were used for agitation. They were positioned about 1 inch above the bottom the vessel and about 140 degrees apart. Ammonia was metered with a rotameter and fed at 12.9 grams per minute through a ring sparger located near the bottom of the vessel. The sparger was a 5-inch ring of ¼-inch tubing that contained 20 uniformly spaced, 1/32-inch ports facing toward the bottom.

In making a test, phosphate rock was added to the preparation vessel (about 2 minutes) containing the nitric acid. An antifoaming agent (20 to 30 drops) was used as necessary to control foaming. After the rock was added (1200 g. phosphate rock/batch, 20 minutes was allowed for extraction. In all tests, sufficient nitric acid was used to give an $HNO_3$:CaO mole ratio of 1.86, which was established in earlier work[1] as about the minimum acid:lime ratio for complete dissolution of rock $P_2O_5$ in about 20 minutes. Ammoniation was begun immediately after the 20-minute extraction period. In tests in which 11–37–0 was added, ammoniation was interrupted at pH of 2.3 to 2.9 and the 11–37–0 was poured rapidly into the suspension. Previous tests had indicated that precipitation of unavailable $P_2O_5$ had not yet begun at pH of about 2.4. It was considered inadvisable to add the 11–37–0 at lower pH because of increased possibility of hydrolysis of the polyphosphate at low pH. After addition of 11–37–0, ammoniation was resumed and carried to pH of 7.5 to 8.5.

The results of these tests show that addition of as little as 15 percent of the total $P_2O_5$ as 11–37–0 (test 45) permitted production of neutral suspension with 98 percent $P_2O_5$ solubility in neutral citrate and 91 percent solubility in alkaline citrate. In a comparable test with no additive (test 49), $P_2O_5$ solubility was only 78 percent in neutral citrate and 30 percent in alkaline citrate. The 78 percent solubility of the product with no additive, although higher than would be expected from some previous data on production of solid nitric phosphates (TVA reprint 157—J. Agr. Food Chem. 1 672–77, 1953), is in agreement with data from a previous test in which a similar suspension was prepared. The grade of the suspension made with 15 percent of the $P_2O_5$ furnished as 11–37–0 was 11.6–11.1–0. Physical properties of the suspension were good. After standing for 1 day, no settling was evident. Viscosity was only 128 centipoises and 99 percent was pourable in a standard pour test. The pH of the suspension was 8.5 immediately after preparation and was essentially unchanged after 7 days. However, after 46 days of standing, the pH had dropped to 4.6, and the $P_2O_5$ solubility had ---
[1] Nielsson, F. T., Yates, L. D., J. Agr. Food Chem. 1 672–77 (1953).

dropped to 72 percent by the A.O.A.C. method and 51 percent by the alkaline citrate method.

For comparison purposes, two tests were made (data not shown) in which 15 percent of the total $P_2O_5$ in suspension was furnished as orthophosphoric acid in exactly the same manner as 11–37–0 was used in test 45. All conditions, including degree of ammoniation, were essentially the same as those in the test with 11–37–0. The results indicated no benefit from addition of the orthophosphoric acid; neutral citrate solubility was only 55 to 60 percent and alkaline citrate solubility was only about 23 percent. The slightly lower neutral citrate solubility in these tests, as compared with that in the tests without additive was probably due to slightly low degree of ammoniation in the tests without additive.

Use of 11–37–0 additive in the proportion of only 10 percent of the total $P_2O_5$ (tests 44 and 51) instead of 15 percent gave fairly high solubilities (95 percent neutral citrate; 79 percent alkaline citrate) when the addition was made at pH 2.4 (test 51). However, solubilities were considerably lower (82 percent neutral citrate; 43 percent alkaline citrate) when addition of the 10 percent proportion of 11–37–0 was made at pH 2.7 (test 44). This result suggested that the pH at the time of addition of 11–37–0 is critical and subsequent tests, which will be described in detail, established the pH range of 1.9 to 2.5 as the optimum for addition of the reaction inhibitor material. The product made with 10 percent of the $P_2O_5$ from 11–37–0 (added at pH 2.4; test 51) showed drop in pH and loss of $P_2O_5$ solubility during long-term storage. After 36 days, the pH was 3.5, A.O.A.C. solubility was 76 percent, and alkaline citrate solubility was 61 percent.

Use of 11–37–0 equivalent to 20 percent of the total $P_2O_5$ (test 46) gave very high solubilities (97 percent neutral citrate; 94 percent alkaline citrate). Grade of this product was 11.4–11.2–0 and physical properties were good. There was no drop in pH or significant loss in $P_2O_5$ solubility during 44 days of storage. Slightly lower $P_2O_5$ solubilities were obtained in tests in which 30 and 40 percent of the $P_2O_5$ was furnished as 11–37–0; however, this apparently was a result of inadvertently high pH (2.9–3.5) at which these proportions of 11–37–0 were added. The water solubility of the $P_2O_5$ in the slurries was not increased by use of 11–37–0; solubility was less than 10 percent in most tests. This indicated that the favorable effects of 11–37–0 on neutral and alkaline citrate solubility are due to formation of solid phosphate that is soluble in these reagents but insoluble in water. Petrographic examination showed the presence of substantially only dicalcium phosphate.

TABLE I.—EFFECT OF 11-37-0 ADDITIVE ON PROPERTIES OF NEUTRAL NITRIC PHOSPHATE SUSPENSIONS

| Test Number | 49 | 44 | 51 | 45 | 46 | 47 |
|---|---|---|---|---|---|---|
| Additive | None | 11-37-0 ammoniated superphosphoric acid | | | | |
| $P_2O_5$ from additive, percent of total $P_2O_5$ [a] | 0 | 10 | 10 | 15 | 20 | 30 |
| Formulation, lb./ton of product: [b] | | | | | | |
| Phosphate rock [c] | 629 | 620 | 594 | 606 | 578 | 555 |
| Nitric acid (42% $HNO_3$) | 1,463 | 1,441 | 1,380 | 1,410 | 1,343 | 1,290 |
| Additive,[d] 11-37-0 liquid fertilizer [e] | 0 | 61 | 59 | 95 | 129 | 211 |
| Ammonia (gaseous, anhydrous) | 163 | 127 | 134 | 140 | 130 | 131 |
| Extraction: | | | | | | |
| $HNO_3$:CaO mole ratio | 1.86 | 1.86 | 1.86 | 1.86 | 1.86 | 1.86 |
| Time, min | 20 | 20 | 20 | 20 | 20 | 20 |
| Ammoniation: | | | | | | |
| pH at which 11-37-0 was added | | 2.7 | 2.4 | 2.3 | 2.5 | 2.9 |
| Terminal pH | 7.5 | 7.9 | 8.4 | 8.5 | 8.5 | 8.0 |
| pH after 3-7 days | 4.6 | 3.1 | 8.2 | 8.4 | 8.4 | 8.1 |
| $NH_3$:$NO_3$ mole ratio (by analysis) | 0.87 | 0.85 | 0.81 | 0.85 | 0.90 | 0.98 |
| CaO:$P_2O_5$ mole ratio (after addition of additive) | 3.60 | 3.24 | 3.24 | 3.05 | 2.87 | 2.52 |
| Chemical analysis of slurry,[f] percent: | | | | | | |
| Total N | 12.7 | 12.2 | 11.2 | 11.6 | 11.4 | 11.5 |
| $NH_3$N | 5.9 | 5.6 | 5.0 | 5.3 | 5.4 | 5.7 |
| Total $P_2O_5$ | 10.2 | 11.1 | 10.7 | 11.3 | 11.5 | 12.6 |
| Neutral citrate-soluble $P_2O_5$[g] | 8.0 | 9.1 | 10.2 | 11.1 | 11.2 | 12.1 |
| Alkaline citrate-soluble $P_2O_5$[g] | 3.1 | 4.8 | 8.5 | 10.3 | 10.8 | 11.3 |
| Water-soluble $P_2O_5$ | 0.4 | 1.0 | 0.1 | 0.2 | 1.0 | 1.2 |
| $P_2O_5$ solubility, percent of total $P_2O_5$: | | | | | | |
| Neutral citrate (A.O.A.C.) [g] | 78 | 82 | 95 | 98 | 97 | 96 |
| Alkaline citrate [g] | 30 | 43 | 79 | 91 | 94 | 90 |
| Water soluble | 4 | 9 | 1 | 2 | 9 | 10 |
| Physical properties of slurry (after standing 1 day at 75°–80° F.): | | | | | | |
| Apparent viscosity,[h] centipoises | 96 | 176 | 430 | 128 | 132 | 196 |
| Settled,[i] percent | 2 | 3 | 0 | 0 | 4 | 5 |
| Pourability,[j] percent | 99 | 97 | 98 | 99 | 95 | 96 |

[a] Remainder of $P_2O_5$ from rock.
[b] Based on weights of materials fed to batch.
[c] Florida flotation concentrate; −10 mesh, 32.9% $P_2O_5$, 46.8% CaO. 1,200 grams used per batch.
[d] Added during ammoniation.
[e] 11.1% N, 37.0% total $P_2O_5$ (71% of total $P_2O_5$ in nonortho form).
[f] Analyses made within 1 week of preparation.
[g] Includes water-soluble $P_2O_5$.
[h] Brookfield viscometer at 100 r.p.m.
[i] Clear layer, percent of total volume.
[j] Percent pourable in 1 minute from quart jar tilted 45 degrees.

EXAMPLE II—FIGURE 2

Effect of pH at time of addition

A 1200-gram charge of minus 10-mesh Florida flotation concentrate was extracted batchwise with 42 percent nitric acid; the $HNO_3$:CaO extraction mole ratio was 1.86. After a 20 minute extraction period, batchwise ammoniation with gaseous anhydrous ammonia was begun in the extraction vessel. When a specified degree of ammoniation had been reached, as indicated by measurement of pH of the slurry, ammoniation was stopped momentarily and 11–37–0 ammoniated superphosphoric acid, equivalent to 15 percent of the total $P_2O_5$ in the final suspension, was added. Ammoniation then was resumed and carried to about pH 8. In a series of seven tests (Table II below and FIGURE 2), the pH at which the 11–37–0 was added was varied from <1 to 4.1 to determine the effect of this variable. Portions of the resultant slurries were analyzed within 1 week while other portions were used to determine handling and storage properties including effects of storage on $P_2O_5$ solubility. For comparison purposes, one test (No. 63, Table II) was made without any additive, another (No. 55) with orthophosphoric acid as the additive, and a third (No. 66) with ammoniated orthophosphoric acid (8–24–0 grade).

Results in this series of tests show that the highest neutral and alkaline citrate solubilities of $P_2O_5$ were obtained when the 11–37–0 was added in the pH range of about 1.9 to 2.5 (tests 58, 45, and 57). With addition in this range, neutral citrate solubility was above 95 percent and alkaline citrate solubility was above 90 percent as compared with 67 and 25 percent, respectively, when 11-37-0 was omitted (test 63, Table II).

When 11-37-0 was added before the optimum pH range was reached, the alkaline citrate solubility was drastically reduced and the neutral citrate solubility was reduced somewhat also. For example, when addition was at pH 1.7 (test 56), the neutral and alkaline citrate solubilities were only 93 and 80 percent, respectively. When the 11-37-0 was added before ammoniation was started (pH <1; test 62), the respective availabilities were only 86 and 51 percent.

Withholding addition of the 11-37-0 until after the optimum pH range had been exceeded (for example, addition at pH 3.1 and 4.1 in tests 61 and 60, respectively) likewise gave reduced neutral and alkaline citrate solubilities. Apparently some insoluble apatite had formed prior to addition of the 11-37-0 and persisted after the addition of 11-37-0.

Neither orthophosphoric acid additive (test 55) nor 8-24-0 ammoniated orthophosphoric acid (test 66) were effective in increasing neutral or alkaline citrate solubility of $P_2O_5$ in slurries. Although these materials were added in the same proportion (15 percent of total $P_2O_5$) as was the 11-37-0, the neutral and alkaline citrate solubilities of the $P_2O_5$ were essentially the same as without any additive (test 63). This constitutes strong evidence that the polyphosphate content of the 11-37-0 is the effective agent in increasing $P_2O_5$ solubilities.

version of $P_2O_5$ to apatite or other unavailable forms of phosphate, special chemical analyses and petrographic examinations were made in one test (similar to test 45, Table II) in which 11-37-0 was added (15 percent of total $P_2O_5$) at pH 2.3 and in another test (test 66, Table II) in which the same amount of 8-24-0 ammoniated orthophosphoric acid was added at the same pH. The special analyses included total CaO, water-soluble CaO, and water-soluble nitrogen. Results of the chemical analyses, which were made within 1 week of preparation of the suspensions, are summarized in the following tabulation:

|  | Test with— | |
|---|---|---|
|  | Polyphosphate (11-37-0) additive | Orthophosphate (8-24-0) additive |
| Percent of total CaO: |  |  |
| In solids | 79 | 95 |
| In liquid | 21 | 5 |
| CaO:$P_2O_5$ mole ratio in solids | 2.5 | 3.2 |
| Percent of total nitrogen: |  |  |
| In solids | 1 | 0 |
| In liquid | 99 | 100 |

These results show that with 11-37-0 additive 21 percent of the total calcium was held in the solution phase during ammoniation as compared with only 5 percent when polyphosphate was not used. As a result, the CaO:$P_2O_5$ mole ratio in the solid phase of the slurry with TABLE II.—EFFECT OF PHOSPHATE ADDITIVES IN BATCH AMMONIATION OF NITRIC PHOSPHATE SUSPENSION FERTILIZERS

| Test Number | 63 | 62 | 56 | 58 | 45 | 57 | 61 | 60 | 55 | 66 |
|---|---|---|---|---|---|---|---|---|---|---|
| Type of additive [a] | None | 11-37-0 ammoniated superphosphoric acid [b] | | | | | | | Orthophosphoric acid (80% $H_3PO_4$) | 8-24-0 ammoniated orthophosphoric acid |
| pH at time of addition | | <1 [c] | 1.7 | 1.9 | 2.3 | 2.5 | 3.1 | 4.1 | 2.3 | 2.3 |
| $P_2O_5$ from additive, percent of total $P_2O_5$ [d] | 0 | 15 | 15 | 15 | 15 | 15 | 15 | 15 | 15 | 15 |
| Formulation, lb./ton of $P_2O_5$ in product: | | | | | | | | | | |
| Phosphate rock [e] | 6,060 | 5,160 | 5,160 | 5,160 | 5,160 | 5,160 | 5,160 | 5,160 | 5,160 | 5,160 |
| Nitric acid (42% $HNO_3$) | 14,340 | 12,200 | 12,200 | 12,200 | 12,200 | 12,200 | 12,200 | 12,200 | 12,200 | 12,200 |
| Additive: | | | | | | | | | | |
| 11-37-0 [b] | | 811 | 811 | 811 | 811 | 811 | 811 | 811 | | |
| Orthophosphoric acid (80% $H_3PO_4$) | | | | | | | | | 518 | |
| 8-24-0 ammoniated $H_3PO_4$ | | | | | | | | | | 1,250 |
| Ammonia (gaseous anhydrous) [f] | 1,590 | 1,602 | 1,197 | 1,184 | 1,002 | 1,241 | 1,226 | 1,366 | 1,511 | 1,410 |
| Water [g] | 0 | 1,510 | 863 | 641 | 213 | 430 | 0 | 0 | 0 | 0 |
| Extraction: | | | | | | | | | | |
| $HNO_3$:CaO mole ratio | 1.86 | 1.86 | 1.86 | 1.86 | 1.86 | 1.86 | 1.86 | 1.86 | 1.86 | 1.86 |
| Time, min | 20 | 20 | 20 | 20 | 20 | 20 | 20 | 20 | 20 | 20 |
| Ammoniation: | | | | | | | | | | |
| $NH_3$:$HNO_3$ mole ratio (by analysis) | 0.94 | 1.15 | 0.93 | 0.95 | 0.85 | 0.97 | 0.94 | 1.05 | 1.09 | 1.11 |
| CaO:$P_2O_5$ mole ratio (after addition of additive) | 3.64 | 3.05 | 3.05 | 3.05 | 3.05 | 3.05 | 3.05 | 3.05 | 3.05 | 3.05 |
| pH at end of ammoniation | 8.2 | 8.5 | 8.3 | 8.4 | 8.5 | 8.5 | 8.5 | 8.5 | 8.2 | 8.3 |
| pH after 6 days | 8.3 | 8.8 | 8.6 | 8.6 | 8.4 | 8.8 | 8.7 | 8.7 | 8.7 | |
| Chemical analysis of slurry,[h] percent: | | | | | | | | | | |
| Total N | 13.5 | 12.8 | 11.8 | 11.9 | 11.6 | 12.2 | 12.5 | 13.3 | 14.2 | 13.2 |
| $NH_3$N | 6.6 | 6.9 | 5.7 | 5.8 | 5.3 | 6.0 | 6.1 | 6.8 | 7.4 | 7.0 |
| Total $P_2O_5$ | 10.1 | 9.8 | 10.6 | 10.9 | 11.3 | 10.8 | 11.1 | 11.2 | 11.9 | 11.1 |
| Neutral citrate-soluble $P_2O_5$ [i] | 6.8 | 8.4 | 9.9 | 10.5 | 11.1 | 10.5 | 10.0 | 9.2 | 7.3 | 7.1 |
| Alkaline citrate-soluble $P_2O_5$ [i] | 2.5 | 5.0 | 8.5 | 10.1 | 10.3 | 9.8 | 8.3 | 6.9 | 2.7 | 2.6 |
| Water-soluble $P_2O_5$ | <0.1 | 1.9 | 0.9 | 1.3 | 0.2 | 1.2 | 1.1 | 2.1 | 0.6 | 1.0 |
| $P_2O_5$ solubility, percent of total $P_2O_5$: | | | | | | | | | | |
| Neutral citrate (A.O.A.C.) [i] | 67 | 86 | 93 | 96 | 98 | 97 | 90 | 82 | 61 | 64 |
| Alkaline citrate [i] | 25 | 51 | 80 | 93 | 91 | 91 | 75 | 62 | 23 | 23 |
| Water soluble | <1 | 19 | 9 | 12 | 2 | 11 | 10 | 19 | 5 | 9 |
| Physical properties after 1 day at 75°-80° F.: | | | | | | | | | | |
| Apparent viscosity,[j] centipoises | 48 | 56 | 112 | 212 | 128 | 120 | 120 | 112 | 52 | 40 |
| Settled,[k] percent | 3 | 8 | 6 | 0 | 0 | 3 | 0 | 0 | 26 | 36 |
| Pourability,[l] percent | 99 | 99 | 99 | 98 | 99 | 99 | 99 | 98 | 98 | 98 |

[a] Added during ammoniation, at pH indicated.
[b] 11.1% N; 37.0% $P_2O_5$ (71% of $P_2O_5$ in nonortho form).
[c] 11-37-0 added before start of ammoniation.
[d] Remainder of $P_2O_5$ was from rock.
[e] Florida flotation concentrate; −10 mesh, 33.0% $P_2O_5$, 47.5% CaO.
[f] Quantities calculated from $NH_3$:$P_2O_5$ ratio in final slurry.
[g] Water was added as required to maintain fluidity.
[h] Analyses made within 1 week of preparation.
[i] Includes water-soluble $P_2O_5$.
[j] Brookfield viscometer at 100 r.p.m.
[k] Clear layer, percent of total volume.
[l] Percent pourable in 1 minute from quart jar tilted 45 degrees.

Mechanism of action: To provide information as to the mechanism by which 11-37-0 additive inhibits re- 11-37-0 additive was only 2.5, which indicates a high content of dicalcium phosphate (CaO:$P_2O_5$ mole ratio=

2.0). Petrographic examination confirmed that the solids in this test were largely anhydrous dicalcium phosphate with apatite present only as a minor phase. In the test without polyphosphate additive, 95 percent of the total CaO was found in the solid phase. The $CaO:P_2O_5$ mole ratio (3.2) in this solid corresponded closely to that of $P_2O_5$ was from 11–37–0, there was no significant change in solubility or pH in this length of time. Further pH measurements and $P_2O_5$ solubility determinations were made after 60 to 75 days of storage. These measurements, together with the previously mentioned ones, are summarized in Table III below.

TABLE III.—EFFECT OF STORAGE ON pH AND $P_2O_5$ SOLUBILITY OF NITRIC PHOSPHATE SUSPENSION FERTILIZERS MADE WITH 11–37–0 ADDITIVE [a]

| Test Number | 51 | | 45 | | | 46 | | | 47 | |
|---|---|---|---|---|---|---|---|---|---|---|
| $P_2O_5$ from 11–37–0, percent of total $P_2O_5$ [b] | 10 | | 15 | | | 20 | | | 30 | |
| Days of storage (75°–80° F.) | 7 | 36 | 7 | 46 | 60 | 7 | 44 | 60 | 7 | 75 |
| pH | 8.4 | 3.5 | 8.5 | 4.6 | 3.3 | 8.2 | 8.2 | 5.1 | 8.0 | 7.6 |
| $P_2O_5$ solubility, percent of total $P_2O_5$: | | | | | | | | | | |
| Neutral citrate (A.O.A.C.) | 95 | 76 | 98 | 72 | 66 | 97 | 97 | 87 | 96 | 97 |
| Alkaline citrate (Netherlands method) | 79 | 61 | 91 | 51 | 47 | 94 | 91 | 63 | 90 | 81 |
| Water soluble | 1 | 11 | 2 | 9 | 7 | 9 | 9 | 4 | 10 | 3 |

[a] Data on preparation given in Example I.
[b] 11–37–0 added to partially ammoniated slurry of pH 2.3 to 2.9; ammoniation then carried to pH 8.0–8.5.

apatite, and petrographic examination confirmed that apatite was the major constituent. Dicalcium phosphate was present only in a very minor proportion. In the tests both with and without 11–37–0 additive, essentially all of the nitrogen was in the solution phase of the slurry, which discounts the possibility that the 11–37–0 might be promoting formation of calcium ammonium phosphate compounds insoluble in the suspension.

In another series of tests, a blend of reagent-grade dicalcium phosphate, calcium oxide, and calcium fluoride was substituted for phosphate rock in the preparation of nitric phosphate suspension with and without use of 11–37–0 additive. Chemical and petrographic studies in this series showed the same effects of 11–37–0 as were described above for the tests with phosphate rock. These tests demonstrated, therefore, that the effects of 11–37–0 are independent of the iron, aluminum, or other impurity content of the rock.

In still another series of tests it was determined that in neutral suspension prepared with polyphosphate additive according to my recommended procedures, the polyphosphate is associated intimately with the solid phase of the suspension, most probably as a protective coating on the surface of dicalcium phosphate crystals, which inhibits reaction of the dicalcium phosphate with soluble calcium in the solution phase of the suspension. Analyses failed to detect any polyphosphate in the solution phase of the final neutral suspension. Furthermore, it was determined that the inhibited solid phase was unreactive toward soluble calcium, whereas, soluble calcium in the solution phase was highly reactive toward fresh, uninhibited dicalcium phosphate crystals added to the liquid phase.

From the results of these various series of tests, I have concluded that additives from the group of materials comprising my reaction inhibitor materials function through interaction of the additive with solid dicalcium phosphate in suspensions to coat or otherwise protect this dicalcium phosphate from reaction with soluble calcium present in the solution phase. Thereby, reversion of the dicalcium phosphate to apatite or other unavailable forms of phosphate is prevented.

EXAMPLE III

Storage tests

In preceding examples, data on pH and $P_2O_5$ solubility were given for suspensions of various 11–37–0 contents that had been stored 36 to 46 days at 75° to 85° F. In that length of storage, there was considerable loss of $P_2O_5$ citrate solubility and drop in pH when the suspensions were made with 10 or 15 percent of the $P_2O_5$ furnished as 11–37–0. However, when about 20 percent of the $P_2O_5$ was from 11–37–0, there was no significant change in solubility or pH in this length of time. Further pH measurements and $P_2O_5$ solubility determinations were made after 60 to 75 days of storage. These measurements, together with the previously mentioned ones, are summarized in Table III below.

Data in Table III supra show that the suspension made with 20 percent of the $P_2O_5$ from 11–37–0, although essentially unaffected by 44 days of storage, deteriorated significantly between the forty-fourth and sixtieth day of storage. Neutral citrate solubility dropped from 97 percent to 87 percent, alkaline citrate solubility dropped from 91 percent to 63 percent, and pH dropped from 8.2 to 5.1. The product made with 30 percent of the $P_2O_5$ from 11–37–0, however, did not lose significant $P_2O_5$ solubility in 75 days of storage and pH remained high (7.6 vs. initial 8.0).

The data show also that the product made with only 15 percent of the $P_2O_5$ from 11–37–0, which lost considerable solubility during 46 days of storage, deteriorated further during storage for 60 days. After 60 days, the neutral citrate solubility was only 66 percent, the alkaline citrate solubility was only 47 percent, and pH had dropped to 3.3 from an initial 8.5.

There was no consistent effect of storage on water solubility of $P_2O_5$, which ranged from 1 to 11 percent. There was, however, a clear relationship between pH of the slurry and $P_2O_5$ citrate solubilities. Decreases in $P_2O_5$ solubility were in all cases accompanied by significant drops in pH. It is assumed that the deterioration of the slurries during storage is a result of slow hydrolysis of the polyphosphate. In the absence of polyphosphate inhibitor, calcium nitrate in the solution phase apparently reacted with the precipitated dicalcium phosphate to form apatite generally in accordance with the following equation:

$$4Ca(NO_3)_2 + 6CaHPO_4 + 2HF \rightarrow Ca_{10}F_2(PO_4)_6 + 8HNO_3$$

The accompanying formation of nitric acid is apparently responsible for the observed drop in pH.

EXAMPLE IV—FIGURES 3 AND 4

Tests without acyclic polyphosphate additive—Negative examples

Referring now more specifically to FIGURE 3, a test (test 92) was made in which a nitric acid extract of phosphate rock was ammoniated without additives of any kind including materials comprising my reaction inhibitors. In this test, the proportion of nitric acid (42 percent $HNO_3$ concentration) used in the extraction step provided a $HNO_3:CaO$ mole ratio of 1.86 which, as has been indicated supra, was found to be about the minimum required for complete solubilization of $P_2O_5$ in the rock. The $CaO:P_2O_5$ mole ratio in the extract was 3.64, the same as that in the rock from which the extract was prepared. The conditions under which this test was conducted and results therefrom are shown in Table IV below and in FIGURE 3.

TABLE IV.—PREPARATION OF NITRIC PHOSPHATE SUSPENSIONS BY BATCH AMMONIATION OF ROCK-ACID EXTRACT WITH AND WITHOUT POLYPHOSPHATE ADDITIVE

| Test Number | 92 | 99 | 100 |
|---|---|---|---|
| | Tests without polyphosphate additive | | Test with 11-37-0 additive [a] |
| Nominal grade | Unadjusted extract | 9-9-9 | 9-9-9 |
| $P_2O_5$ from rock, percent of total $P_2O_5$ [b] | 100 | 80 | 85 |
| Formulation, lb./ton of $P_2O_5$ in product: | | | |
| Phosphate rock [c] | 6,060 | 4,848 | 5,152 |
| Nitric acid (42% $HNO_3$) | 14,340 | 12,704 | 13,500 |
| Additives: | | | |
| 11-37-0 [a] | 0 | 0 | 811 |
| Orthophosphoric acid (54% $P_2O_5$) [d] | 0 | 741 | 0 |
| Potassium chloride (62% $K_2O$) | 0 | 3,236 | 3,220 |
| Ammonia (gaseous anhydrous) [e] | 1,526 | 1,510 | 1,349 |
| Extraction: | | | |
| $HNO_3$:CaO mole ratio | 1.86 | 2.06 | 2.06 |
| ($HNO_3$+0.5 $H_3PO_4$):CaO mole ratio [f] | | 2.13 | |
| Time, min | 20 | 20 | 20 |
| Ammoniation: | | | |
| CaO:$P_2O_5$ mole ratio (after addition of additive if any) | 3.64 | 2.91 | 3.10 |
| Final $NH_3$:$HNO_3$ mole ratio | 0.94 | 1.05 | 0.88 |
| pH at end of ammoniation | 8.0 | 8.2 | 8.2 |
| pH after 1 day | 8.4 | 7.0 | 8.3 |
| Chemical analysis of final slurry, [g] percent: | | | |
| Total N | 12.8 | 12.1 | 10.5 |
| $NH_3N$ | 6.2 | 6.2 | 4.9 |
| Total $P_2O_5$ | 10.4 | 9.9 | 9.6 |
| Neutral citrate-soluble $P_2O_5$ [h] | 8.3 | 8.0 | 9.7 |
| Alkaline citrate-soluble $P_2O_5$ [h] | 3.5 | 5.3 | 8.5 |
| $P_2O_5$ solubility, percent of total $P_2O_5$: | | | |
| Neutral citrate (A.O.A.C.) [h] | 79.8 | 80.8 | 100 |
| Alkaline citrate [h] | 33.7 | 53.5 | 88.5 |

[a] Ammoniated electric-furnace superphosphoric acid; 11.1% N, 37.0% $P_2O_5$ (71% of $P_2O_5$ in nonortho form). Added to slurry after ammoniation had been carried to pH 2.3.
[b] Remainder from additive.
[c] Florida flotation concentrate; 33.0% $P_2O_5$, 47.5% CaO. Size −10 mesh.
[d] Wet-process acid; acid added to $HNO_3$ prior to extraction.
[e] Quantity aclculated from $NH_3$:$NO_3$ ratio in final slurry.
[f] Effective acidulation ratio, based on assumption that $H_3PO_4$ reacts with rock to form monocalcium phosphate.
[g] Chemical analyses made 1 day after preparation of slurry.
[h] Includes water-soluble $P_2O_5$.

Sampling during ammoniation covered the range of ammoniation from about 0.5 to 1.0 $NH_3$:$NO_3$ mole ratio, which corresponded to a pH range of about 2 to 8.3. An N:$P_2O_5$ weight ratio of 1:1 in the slurry was reached with ammoniation to only about 0.5 $NH_3$:$NO_3$ mole ratio. With this degree of ammoniation, both neutral and alkaline citrate solubility of the $P_2O_5$ were essentially 100 percent and X-ray analyses showed that the $P_2O_5$ in the solid phase was present chiefly as dicalcium phosphate; no apatite was present. However, with only this degree of ammoniation the slurry was extremely acidic (pH<2).

Analyses of samples taken during further ammoniation of the unadjusted extract (FIGURE 3) show that formation of apatite in the slurry began at $NH_3$:$NO_3$ ratio of about 0.55 (pH about 2) and progressed throughout further ammoniation. This formation of apatite presumably represents a conversion of dicalcium phosphate according to the following reaction:

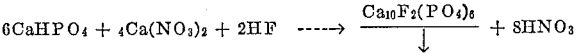

$$6CaHPO_4 + 4Ca(NO_3)_2 + 2HF \longrightarrow Ca_{10}F_2(PO_4)_6\downarrow + 8HNO_3$$

After ammoniation had been carried to $NH_3$:$NO_3$ mole ratio of 0.8 (pH about 4), only about 25 percent of the total $P_2O_5$ remained in nonapatite forms. About 10 percent of the $P_2O_5$ remained as dicalcium phosphate, while the remainder of the nonapatite $P_2O_5$ was accounted for largely as iron and aluminum phosphates. With further ammoniation to $NH_3$:$NO_3$ mole ratio of about 0.95 (pH about 8), conversion of dicalcium phosphate to apatite was essentially complete; only a trace of dicalcium phosphate was found in the product. Other nonapatite $P_2O_5$ in the product still represented about 15 percent of the total $P_2O_5$.

The formation of apatite during ammoniation in this test was accompanied by decreases in solubility of the $P_2O_5$ in both neutral and alkaline citrate reagents. With ammoniation up to $NH_3$:$NO_3$ mole ratio of about 0.75 (pH about 3.5), the decreases in alkaline citrate solubility of the $P_2O_5$ in the slurries corresponded very closely to decreases in the proportion of nonapatite $P_2O_5$ as determined by X-ray analyses (FIGURE 3). Alkaline citrate solubility of $P_2O_5$ in the slurry with $NH_3$:$NO_3$ mole ratio of 0.75 was about 40 percent. Further ammoniation resulted in further large decrease in the proportion of nonapatite $P_2O_5$ but did not result in a correspondingly large decrease in alkaline citrate solubility. This suggests that the apatite formed at pH above about 3.5 probably had an appreciable solubility in the alkaline citrate reagent, whereas, that which formed below pH 3.5 was relatively insoluble. Particle size studies indicated that this difference is solubility is a result, at least in part, of smaller particle size of the apatite formed at relatively high pH. The apatite that formed up to pH 3.5 was partially insoluble also in neutral citrate reagent; formation of this apatite decreased solubility of the $P_2O_5$ in neutral citrate reagent to about 80 percent of the total $P_2O_5$. There was no further decrease, however, with further ammoniation. Preliminary particle size studies indicated that the apatite that was insoluble in the neutral citrate reagent was somewhat larger than that which was soluble in this reagent.

Referring now more specifically to FIGURE 4 and to that portion of Table IV supra which relates to test 99, it is seen that neither use of orthophosphoric acid additive nor use of potassium chloride additive provided beneficial effects on $P_2O_5$ availability such as are obtainable through use of an additive selected from my group of acyclic polyphosphate compounds. In test 99, the proportion of nitric acid used in the extraction step provided an $HNO_3$:CaO mole ratio of 2.06. The phosphoric acid, which was added to the nitric acid prior to extraction, provided 20 percent of the total $P_2O_5$; the remainder was from the rock. Addition of this amount of phosphoric acid altered the CaO:$P_2O_5$ mole ratio only from 3.64 to 2.91; thus the proportion of lime in the slurry was still considerably in excess of that required to form only dicalcium phosphate ($CaO:P_2O_5=2.0$) with the $P_2O_5$ present.

Results of this test, as illustrated in FIGURE 4, show that the $N:P_2O_5$ ratio in the product slurry reaches 1.0 at an ammoniation of 0.68 $NH_3:NO_3$ mole ratio (pH 1.5). With this degree of ammoniation, none of the $$P_2O_5$$

was in the form of apatite and all was soluble in both neutral and alkaline citrate reagents. About 55 percent of the total $P_2O_5$ was found to be present as dicalcium phosphate. As ammoniation continued, however, the formation of apatite began and progressed until at an $$NH_3:NO_3$$

mole ratio of 1.0 (pH 7) all but about 10 percent of the $P_2O_5$ in the product was the form of apatite. These observations are based on the analytical data shown in FIGURE 4, which were obtained on 1-day old samples and on X-ray data obtained on samples several hours old. There was indication, however, from pH data that the formation of apatite was slower in this test than in the previously described test without additive. The pH data showed that samples ammoniated to pH above about 4 became more acidic on standing. The phenomenon of unstable pH has been observed repeatedly in preparation of nitric phosphate suspensions containing various additives. It is postulated that constituents of certain additives are to some extent absorbed by the surfaces of dicalcium phosphate crystals in the slurry and thus interfere with reaction of the dicalcium phosphate to form apatite. Sulfuric acid additive has exhibited such a short-term inhibiting effect. However, as has been shown and will be shown further, the additives selected from my group of acyclic polyphosphate compounds are superior in that their reaction inhibiting effect is more nearly complete and of much longer duration.

EXAMPLE V—FIGURE 5

As is shown in the second portion of Example IV supra, when a neutral slurry of 1:1:1 ratio was prepared by adding phosphoric acid and potassium chloride to nitric acid-phosphate rock extracts and subjecting the resulting slurry to ammoniation without the benefit of an additive selected from the group comprising may reaction inhibiting materials, both the neutral citrate and alkaline citrate solubility was drastically reduced and, further, there was evidenced a marked increase of the proportion of $P_2O_5$ present as apatite at the expense of the proportion of $P_2O_5$ present as dicalcium phosphate.

Referring now more specifically to FIGURE 5 and to that portion of Table IV supra which relates to test 100, it is seen that much improved results were obtained when suspension of 1:1:1 ratio, originally prepared in part from nitric acid-phosphate rock extract, was subsequently subjected to ammoniation with the benefit of an additive selected from the group comprising my reaction inhibiting materials. In this test, the proportion of nitric acid used was that required to give a $HNO_3:CaO$ mole ratio of 2.06 exactly as in test 99 supra. In test 100, the amount of reaction inhibiting material, specifically 11–37–0, used was sufficient to provide 15 percent of the total $P_2O_5$. The remainder of the $P_2O_5$ (85 percent of total) was furnished as rock. On the basis of results of previous tests, the 11–37–0 was (in this test 100) added to the slurry after ammoniation had progressed to a pH of 2.3.

The results of this test show that the incorporation of one of my reaction inhibiting materials effectively inhibits formation of apatite during ammoniation to a pH of about 8. Further, both the neutral and alkaline citrate solubility of the $P_2O_5$ remained about 95 percent throughout the ammoniation. After ammoniation to pH 8, X-ray analyses indicated that less than about 5 percent of the $P_2O_5$ was in the form of apatite. Storage tests indicate that the availability of the $P_2O_5$ would remain high under normal conditions of product handling, storage, and application in the field. This was based on the fact that the pH of samples ammoniated to various degrees remained stable for 30 days.

EXAMPLE VI—FIGURES 6 AND 7

Tests with additives other than those selected from the group comprising my reaction inhibiting materials— Negative example As I have reported supra, I have tried various additives which have been reported in the prior art to determine if some beneficial effects or improved ammoniation characteristics of nitric acid-phosphate rock extracts do in fact occur. As I have also indicated supra, the results of these tests proved that what is reported along these lines in the prior art in fact leaves much to be desired in meeting the intended objectives. This example therefore includes the results I have obtained in attempting to use various of these additives and, as will be seen infra, it is only when I use materials selected from the group comprising my reaction inhibiting materials wherein I am able to prevent the formation of apatite during the ammoniation of nitric acid phosphate rock extracts, slurries, or suspensions.

One series of tests was made with a relatively small proportion of sulfate (about 60 pounds of 93 percent $H_2SO_4$, or the equivalent amount of ammonium sulfate, per ton of suspension). With this proportion of sulfate, the adjusted $CaO:P_2O_5$ mole ratio [a] was 3.28, as compared with 3.6 in the original rock and 2.0 in dicalcium phosphate. The solubility data in these tests are based on analyses made 4 to 13 days after preparation of suspensions.

Referring now more specifically to FIGURE 6 and to those parts of Table V that relate to tests 92, 108, 70, 80, and 94, the data illustrated therein shows that high neutral citrate solubility of $P_2O_5$ (95–100 percent vs. 67–80 percent without additive) resulted when the sulfate was added before extraction, immediately after extraction, or at any stage of ammoniation up to a pH of about 2.5. The sulfate was ineffective, however, when its addition was withheld until after ammoniation had been carried above pH 2.5. In this connection, it is significant to note that pH 2.5 is about the point in the ammoniation step at which precipitation of dicalcium phosphate is complete and conversion to apatite begins. Therefore, it appears that the sulfate additive, in order to be effective, must be present in the system at the time precipitation of apatite normally would begin.

Other more significant data in FIGURE 6 and Table V show that use of the sulfate additives resulted in, at best, only a small increase in alkaline citrate solubility over that obtained without additive. Regardless of when the sulfate was added, alkaline citrate solubilities ranged, rather erratically, between about 40 and 60 percent. There was some indication that solubility was highest (about 60 percent) when the sulfate was added at pH 2.5 during the ammoniation step. Although these analyses were made from 4 to 13 days after preparation of the suspensions, analysis of similar suspensions by X-ray methods within 1 hour after preparation showed that at that time about 65 percent of the total phosphate was already present as precipitated apatite and only about 30 percent remained as dicalcium phosphate.

The pH of the suspensions was initially about 7 to 8. However, in most tests the pH began to drop within an

---

[a] Adjusted $CaO:P_2O_5$ mole ratio $= \dfrac{(CaO-SO_4)}{P_2O_5}$ hour of preparation and reached the range 5 to 6 during the first day of standing. Results of later X-ray studies showed that this drop in pH correlated with reversion of dicalcium phosphate to fluorapatite in the suspensions.

Referring now more specifically to FIGURE 7, a test (test 108) was made to study further the action of a sulfate additive. In this test samples for chemical and X-ray analyses were taken at intervals throughout the ammoniation step and the data are plotted in the manner used in examples supra with and without phosphate additive. The chemical and X-ray analyses shown were made 1 and 2 days, respectively, after preparation of the suspensions. Other X-ray analyses, not shown, were made only 30 minutes after preparation.

It is apparent from FIGURE 7 that the presence of sulfate did not prevent formation of apatite. As in a previous test without additive (test 92) formation of apatite occurred in samples ammoniated to $NH_3:NO_3$ mole ratios above about 0.6 ($NH_3:P_2O_5$ mole ratio, 4.0), which is the theoretical point at which the precipitation of $P_2O_5$ as dicalcium phosphate should be complete, according to the equation:

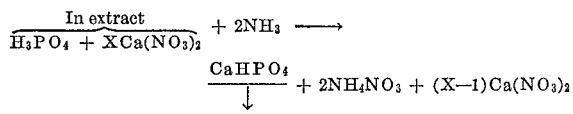

In the sample ammoniated to the highest degree ($NH_3:NO_3$ mole ratio 0.93; initial pH 7.8) about 75 percent of the $P_2O_5$ was in the apatite form 2 days after preparation (data in FIGURE 7). Only 30 minutes after preparation (data not shown) about 63 percent of the $P_2O_5$ had been converted to apatite. Neutral citrate solubility of the $P_2O_5$ remained 100 percent at all degrees of ammoniation, but alkaline citrate solubility was reduced drastically with ammoniation to $NH_3:NO_3$ mole ratios above about 0.6.

Other data in FIGURE 7 show that pH was unstable in samples of suspension ammoniated to initial pH above about 3. The pH of such suspensions began to drop shortly after preparation, dropped rapidly during the first day, and continued to drop slowly for about 40 days. This result indicates that the sulfate additive acted only to provide a short-term delay in the conversion of dicalcium phosphate to apatite; such instability did not occur in suspensions without additive. This delay in reaction was found, by X-ray studies, to favor the formation of smaller apatite crystals, which probably explains the effect of the additive in increasing neutral citrate solubility. It is obvious from these results that use of the sulfate additive in contrast to use of an additive selected from my group of reaction inhibiting materials, did not provide a practical degree of inhibition of the reversion reaction (reversion of dicalcium phosphate to apatite).

Referring now more specifically to that portion of Table V that relates to test 110, it is seen that a larger amount of sulfuric acid additive was used in this test in order that the amount be sufficient to adjust the $CaO:P_2O_5$ mole ratio in the extract to 2.00, the ratio in dicalcium phosphate. It was of interest to determine whether such adjustment might preclude formation of apatite and thereby provide high alkaline citrate solubility. The amount of sulfuric acid (93 percent $H_2SO_4$) required was about 250 pounds per ton of suspension; this was mixed with the nitric acid prior to extraction. Grade of the suspension was only about 9–9–0 as a result of dilution by the acid and by the water was required to maintain fluidity during ammoniation.

X-ray analyses made immediately after preparation of the suspension indicated that 78 percent of the $P_2O_5$ was present as dicalcium phosphate and 8 percent as apatite. On standing, the proportion of apatite increased to 24 percent during the first day and to about 40 percent during the first week. Chemical analyses, made after 1 week of standing, indicated high neutral citrate solubility (about 90 percent) but only 64 percent alkaline citrate solubility. Water solubility of the $P_2O_5$ was 6 percent. Results of this test indicate that even full dajustment of $CaO:P_2O_5$ ratio with sulfuric acid did not provide the desired stable suspension of high alkaline citrate solubility. Also, physical properties of the suspension were unsatisfactory even with dilution to the 9–9–0 grade.

In a previous example, comparison tests were reported in which 15 percent of the total $P_2O_5$ was furnished as orthophosphoric acid or ammoniated orthophosphoric acid. The results showed that this amount of orthophosphoric acid, which was sufficient to adjust $CaO:P_2O_5$ mole ratio only to 3.05, did not improve the alkaline citrate solubility of neutral suspensions, whereas the same proportion of $P_2O_5$ as 11–37–0 ammoniated superphosphoric acid (70 percent polyphosphate) was highly effective. An additional test (test 111) with orthophosphoric acid additive will now be described in which the proportion of phosphoric acid used was sufficient to adjust $CaO:P_2O_5$ mole ratio to 2.0. The amount of acid required accounted for 45 percent of the total $P_2O_5$ in the suspension. It was of interest to determine whether such adjustment would provide stable neutral suspension of high alkaline citrate solubility. Data from this test are included in Table V, infra.

X-ray analyses made 30 minutes after preparation of the suspension indicated that 92 percent of the $P_2O_5$ was present as dicalcium phosphate and that there was no apatite present. After 7 days of standing, 86 percent of the $P_2O_5$ was indicated to be present still as dicalcium phosphate and only 5 percent as apatite; however, chemical analysis at this time showed only about 78 percent solubility in alkaline citrate. Reasons for the discrepancy between the X-ray and chemical analyses are not known. On further standing for 42 days total, the proportion of the $P_2O_5$ found as apatite by X-ray analysis increased to 13 percent. Further chemical analyses were not made. The overall conclusion from this test is that full adjustment of $CaO:P_2O_5$ mole ratio with orthophosphoric acid provided a fairly stable suspension of rather low apatite content. Such a suspension, however, would have a relatively small economic advantage, because of the high proportion of phosphoric acid required.

Tests with magnesium additive

A nitric phosphate suspension containing magnesium sulfate additive was prepared and included in a series of greenhouse tests. Neutral citrate solubility of this suspension was high, but alkaline citrate solubility was not determined. Results of the greenhouse tests were poor. Later two further exploratory tests were made the results of which indicate that magnesium is not effective in providing high alkaline citrate solubility in nitric phosphate suspensions.

In the later tests, magnesium nitrate was used as the additive instead of the sulfate in order to eliminate effects of the sulfate ion and thus make the test specific in regard to magnesium. The additive was dissolved in water and added to the suspension after ammoniation had progressed to about 2.4. In one test, the proportion of additive was such as to provide $Mg:P_2O_5$ mole ratio of 0.145, which was the proportion used in the suspension that was tested previously in the greenhouse. In the other of the tests, the proportion of additive was doubled. Identical results were obtained with both levels of magnesium. Neutral citrate solubilities were 95 percent and alkaline citrate solubilities were only 46 percent.

TABLE V.—PREPARATION OF NITRIC PHOSPHATE SUSPENSION FERTILIZERS BY BATCH AMMONIATION WITH SULFATE AND ORTHOPHOSPHATE ADDITIVES

| Test Number | 92 | 108 | 70 | 80 | 94 | 110 | 111 |
|---|---|---|---|---|---|---|---|
| | | Tests with small amount [a] of sulfate additive | | | | Tests with full adjustment of CaO:$P_2O_5$ mole ratio to 2.0 | |
| Additive | None | $H_2SO_4$ | | $(NH_4)_2SO_4$ [b] | | $H_2SO_4$ | $H_3PO_4$ |
| When added | | With $HNO_3$ | Immediately after extraction | Immediately after extraction | pH 2.2 | With $HNO_3$ | With $HNO_3$ |
| Formulation, lb./ton of $P_2O_5$ in product: | | | | | | | |
| Phosphate rock [c] | 6,060 | 6,060 | 6,060 | 6,060 | 6,060 | 6,060 | 3,340 |
| Nitric acid (42% $HNO_3$) | 14,340 | 14,340 | 14,340 | 14,340 | 14,340 | 8,458 | 7,880 |
| Additives: | | | | | | | |
| Sulfuric acid (93% $H_2SO_4$) | 0 | 569 | 569 | 0 | 0 | 2,438 | 0 |
| $(NH_4)_2SO_4$ (100% basis) [b] | 0 | 0 | 0 | 716 | 716 | 0 | 0 |
| Orthophosphoric acid (86% $H_3PO_4$) | 0 | 0 | 0 | 0 | 0 | 0 | 1,450 |
| Ammonia (gaseous anhydrous) [d] | 1,526 | 1,479 | 1,527 | 1,706 | 1,576 | 1,259 | 984 |
| Water [e] (to maintain fluidity) | −2,726 | −2,648 | −2,696 | −622 | −692 | +655 | −1,534 |
| Extraction: | | | | | | | |
| $HNO_3$:CaO mole ratio | 1.86 | 1.86 | 1.86 | 1.86 | 1.86 | 1.10 | 1.86 |
| $(HNO_3+2H_2SO_4)$:CaO mole ratio [f] | | 2.07 | 2.07 | | | 2.00 | |
| Time, min | 20 | 20 | 20 | 20 | 20 | 20 | 20 |
| Ammoniation: | | | | | | | |
| CaO:$P_2O_5$ mole ratio | 3.64 | 3.64 | 3.64 | 3.64 | 3.64 | 3.64 | [g] 2.00 |
| (CaO−$SO_4$):$P_2O_5$ mole ratio (after addition of sulfate additive) | | 3.28 | 3.28 | 3.28 | 3.28 | 2.00 | |
| Final $NH_3$:$HNO_3$ mole ratio | 0.94 | 0.91 | 0.94 | 1.05 | 0.97 | 1.31 | 1.10 |
| pH at end of ammoniation | 8.0 | 7.8 | 8.4 | 8.1 | 8.1 | 7.7 | 7.7 |
| pH after 1 day | 8.4 | 5.0 | 4.3 | 8.0 | 5.2 | 7.6 | 7.5 |
| Storage time prior to analysis, days | 1 | 13 | 13 | 7 | 13 | 7 | 6 |
| Chemical analysis of final suspension, percent: | | | | | | | |
| Total N | 12.8 | 12.6 | 13.6 | 12.6 | 12.2 | 9.0 | 12.8 |
| $NH_3N$ | 6.2 | 6.0 | 6.6 | 6.4 | 6.0 | 5.1 | 6.8 |
| Total $P_2O_5$ | 10.4 | 10.1 | 10.1 | 9.0 | 9.1 | 10.6 | 16.5 |
| Neutral citrate-soluble $P_2O_5$ [h] | 8.3 | 9.8 | 9.8 | 9.0 | 8.7 | 9.5 | 16.3 |
| Alkaline citrate-soluble $P_2O_5$ [h] | 3.5 | 5.8 | 5.7 | 3.7 | 5.1 | 6.8 | 12.8 |
| Water-soluble $P_2O_5$ | 0 | 0.8 | 0.3 | <0.1 | 0.3 | 0.6 | 2.0 |
| Total CaO | | 14.6 | 14.6 | 13.3 | 13.2 | 15.4 | 13.3 |
| $SO_4$ | | | 2.9 | 2.7 | 2.7 | | |
| $P_2O_5$ solubility, percent of total $P_2O_5$: | | | | | | | |
| Neutral citrate (A.O.A.C.) [h] | 80 | 97 | 97 | 100 | 96 | 90 | 99 |
| Alkaline citrate [h] | 34 | 57 | 62 | 41 | 56 | 64 | 78 |
| Water soluble | 0 | 8 | 3 | 0 | 3 | 6 | 12 |
| Physical properties of suspension (after standing 1 day at 75°–80° F.): | | | | | | | |
| Apparent viscosity, centipoises [i] | 50 | 800 | 1,010 | 135 | 530 | 1,340 | 430 |
| Settled, percent [j] | 7 | 0 | 0 | 0 | 0 | 0 | 11 |
| Pourability, percent [k] | | | | | | | |

[a] Sulfate proportion equivalent to about 60 pounds of 93% $H_2SO_4$ per ton of suspension.
[b] Reagent grade; added as 36% solution.
[c] Florida floatation concentrate: 33.0% $P_2O_5$; 47.5% CaO; minus 10-mesh size.
[d] Quantity calculated from $NH_3$:$NO_3$ ratio in final slurry.
[e] Net addition (+) or loss (−) of water; calculated from $P_2O_5$ balance.
[f] Effective acidulation ratio based on assumption that $H_2SO_4$ reacts with rock to form $CaSO_4$.
[g] After addition of phosphoric acid.
[h] Includes water-soluble $P_2O_5$.
[i] Brookfield viscometer at 100 r.p.m.
[j] Clear layer, percent of total volume.
[k] Percent pourable in 1 min. from qt. jar tilted 45°.

What I claim as new and desire to secure by Letters Patent of the United States is:

1. In the production of nitric phosphate fertilizers wherein particulate phosphate rock is extracted with nitric acid to form a fluid slurry of nitric acid-phosphate rock extract, which fluid slurry is subsequently ammoniated to a terminal pH in the range from about 6 to about 8 to yield a resulting ammoniated nitric acid-phosphate rock fluid slurry for use as nitric phosphates and nitric phosphate suspensions, the improvement wherein the nitric acid-phosphate rock fluid slurry is treated prior to the ultimate terminal ammoniation thereof to ensure a $P_2O_5$ solubility in both neutral citrate and alkaline citrate of greater than about 90 percent in the ultimate product, said improvement comprising contacting said nitric acid phosphate rock fluid slurry while said fluid slurry is in the pH range of about 1.9 to about 2.5 with a reaction inhibiting material in quantity sufficient to supply in the range from about 10 percent to about 20 percent by weight of the total $P_2O_5$ content in the nitric phosphate fertilizer material produced, said quantity of reaction inhibiting material being sufficient to inhibit the conversion to apatite of the soluble calcium in the nitric phosphate fertilizer produced, said reaction inhibiting material characterized by its ability to yield in solution with said nitric acid-phosphate rock fluid slurry acyclic polyphosphate anions and said reaction inhibiting material selected from the group of polyphosphates consisting of ammonium, sodium, potassium, calcium, magnesium, and mixtures thereof; thereafter completing the ammoniation of the nitric acid-phosphate rock fluid slurry extract to the terminal range of about 6 to about 8 whereby the calcium phosphate content in the resulting ammoniated nitric acid-phosphate rock slurry is substantially completely in the form of dicalcium phosphate.

2. An improved process according to claim 1 wherein said reaction inhibiting material is a stable solution of ammonium salts of acyclic polyphosphoric acid.

3. An improved process according to claim 2 wherein said stable solution of ammonium salts of acyclic polyphosphoric acid contains in the range from about 11 to 15 percent nitrogen and 33 to 45 percent phosphorus, said phosphorus expressed as $P_2O_5$.

4. An improved process according to claim 1 wherein said reaction inhibiting material is sodium tripolyphosphate.

5. In the production of nitric phosphate fertilizers wherein particulate phosphate rock is extracted with nitric acid to form a fluid slurry of nitric acid-phosphate rock extract, which fluid slurry is subsequently ammoniated to a terminal pH in the range from about 6 to about 8 to yield a resulting ammoniated nitric acid-phosphate rock fluid slurry for use as nitric phosphates and nitric phosphate suspensions, the improvement wherein the nitric acid-phosphate rock fluid slurry is treated prior to the ultimate terminal ammoniation thereof to ensure a $P_2O_5$ solubility in both neutral citrate and alkaline citrate of greater than about 90 percent in the ultimate product, said improvement comprising:

(1) introducing a stream of fluid slurry of nitric acid-phosphate rock extract and a stream of ammoniating fluid into a first reactor, and adjusting the relative proportions of said nitric acid-phosphate rock extract and ammoniating fluid to maintain the pH in said first reactor in the range from about 1.9 to about 2.5;

(2) simultaneously introducing into said first reactor a stream of reaction inhibiting material in quantity sufficient to supply in the range from about 10 percent to about 20 percent by weight of the total $P_2O_5$ content in the nitric phosphate fertilizer material produced, said quantity of reaction inhibiting material being sufficient to inhibit the conversion to apatite of the soluble calcium in the nitric phosphate fertilizer produced, said reaction inhibiting material characterized by its ability to yield in solution with said nitric acid-phosphate rock fluid slurry acyclic polyphosphate anions and said reaction inhibiting materials selected from the group of polyphosphates consisting of ammonium, sodium, potassium, calcium, magnesium, and mixtures thereof;

(3) subsequently simultaneously introducing a stream of the resulting mixture of partially ammoniated nitric acid-phosphate rock fluid slurry extract, and said reaction inhibiting material from said first reactor into a second reactor, together with a stream of ammoniating fluid; therein intimately mixing said material introduced; controlling the rate of introduction of said ammoniating fluid into said second reaction vessel to maintain the acidity therein in the range from pH 6 to about pH 8; and (4) withdrawing from said second reactor the resulting nitric phosphate fertilizer wherein the calcium phosphate content is substantially completely in the form of dicalcium phosphate.

6. An improved process according to claim 5 wherein said reaction inhibiting material is a stable solution of ammonium salts of acyclic polyphosphoric acid.

7. An improved process according to claim 6 wherein said stable solution of ammonium salts of acyclic polyphosphoric acid contains in the range from about 11 to 15 percent nitrogen and 33 to 45 percent phosphorus, said phosphorus expressed as $P_2O_5$.

8. An improved process according to claim 5 wherein said reaction inhibiting material is sodium tripolyphosphate.

References Cited

UNITED STATES PATENTS

| | | | |
|---|---|---|---|
| 2,738,265 | 3/1956 | Nielsson | 71—43 XR |
| 2,861,878 | 11/1958 | Bigot | 71—39 |
| 3,015,552 | 1/1962 | Striplin et al. | 71—43 XR |
| 3,050,384 | 8/1962 | Bigot | 71—39 |
| 3,264,087 | 8/1966 | Slack et al. | 71—43 |

S. LEON BASHORE, Primary Examiner

B. H. LEVENSON, Assistant Examiner

U.S. Cl. X.R.

71—43; 23—109